United States Patent [19]

Buckethal

[11] 4,019,535
[45] Apr. 26, 1977

[54] MATERIAL SELECTOR SYSTEM

[75] Inventor: Paul J. Buckethal, Villa Hills, Ky.

[73] Assignee: Globe-Union Inc., Milwaukee, Wis.

[22] Filed: May 19, 1975

[21] Appl. No.: 578,571

Related U.S. Application Data

[63] Continuation of Ser. No. 365,599, May 31, 1973, abandoned.

[52] U.S. Cl. .................. 137/625.15; 137/625.41; 137/625.45; 251/175; 251/193; 251/304
[51] Int. Cl.² .................. F16K 11/06; F16K 3/00
[58] Field of Search ............... 137/625.12, 625.13, 137/625.15, 625.18, 625.41, 625.45, 625.46, 625.48, 625.4; 251/175, 192, 193, 301, 304, 326, 327, 358, 368

[56] References Cited

UNITED STATES PATENTS

| | | | |
|---|---|---|---|
| 736,023 | 8/1903 | Ross et al. | 137/625.15 |
| 1,375,205 | 4/1921 | Budzinsky | 137/625.15 |
| 2,649,275 | 8/1953 | Noyes | 251/175 X |
| 2,750,962 | 6/1956 | Kreitchman | 251/175 X |
| 3,570,540 | 3/1971 | McInnes et al. | 137/625.48 |
| 3,645,497 | 2/1972 | Nyboer | 251/326 X |
| 3,805,833 | 4/1974 | Teed | 137/610 |

*Primary Examiner*—Alan Cohan
*Assistant Examiner*—Gerald A. Michalsky
*Attorney, Agent, or Firm*—Neuman, Williams, Anderson & Olson

[57] ABSTRACT

A system, method and apparatus for material handling and more particularly for processing material from a source for use in a material forming apparatus which produces residue material. The system includes storage means, which stores a predetermined amount of materials for use in the apparatus; return means operating cyclically which returns the residue material from the apparatus to the storage means; and a supply means which supplements the residue material with materials from the source, and the methods relate to ways in which such a system can be employed. A unique diverter valve composed of two pieces of substantially rigid material with a hole through each piece forms a part of the system. The two pieces of material are held together with their holes aligned. A piece of slightly deformable plastic, occupying most of the space between the two pieces of rigid material, has an aperture through it which can align with holes in both pieces. The plastic leaves a sufficient space between the pieces of material so as to move freely. The slight deformability of the plastic allows it to seat tightly and provide a complete closure, especially in the presence of a differential pressure.

16 Claims, 11 Drawing Figures

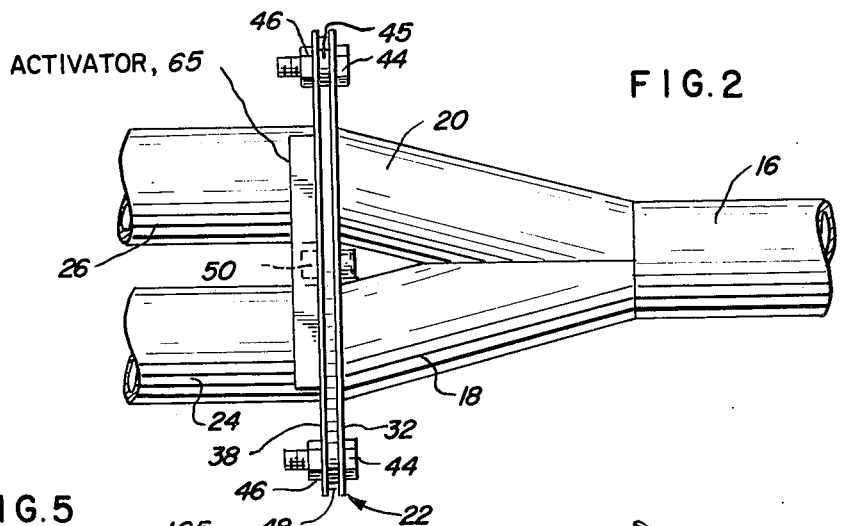
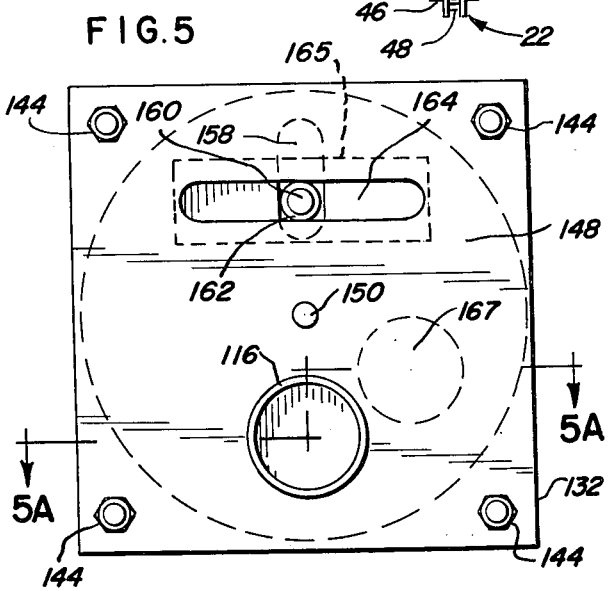
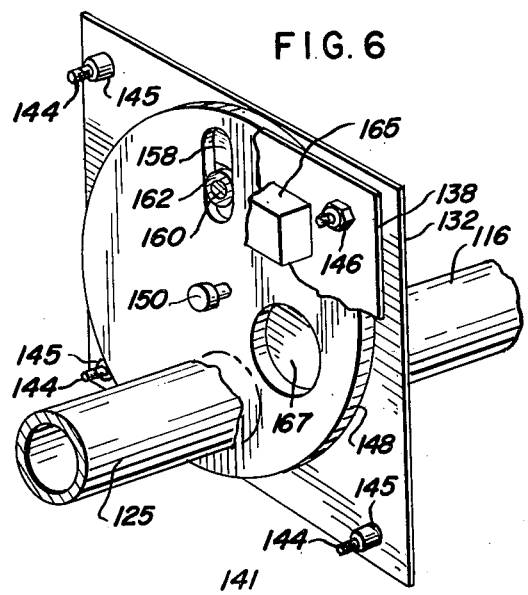
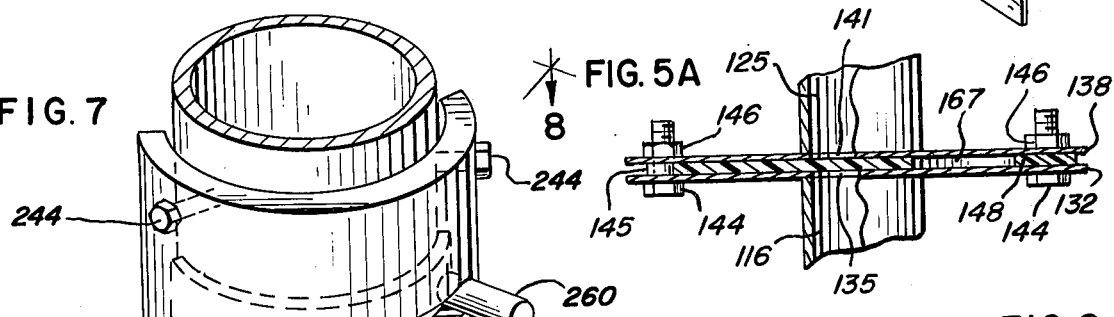
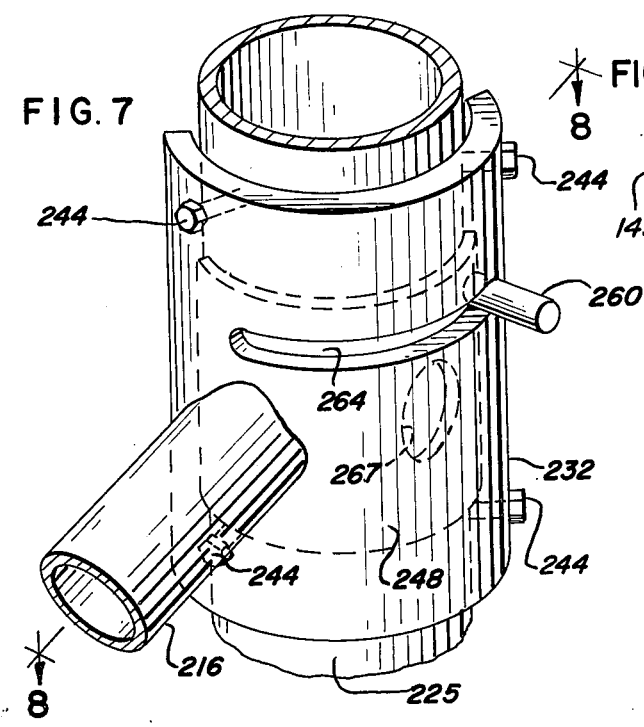
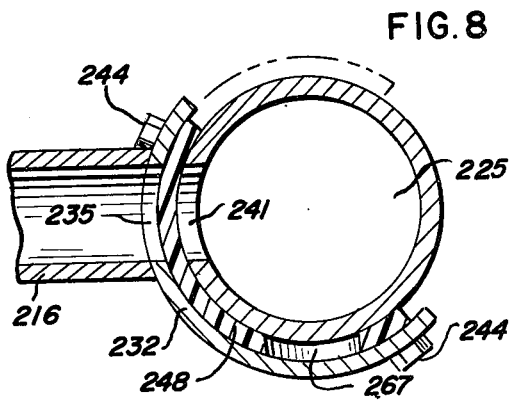

MATERIAL SELECTOR SYSTEM

This is a continuation of application Ser. No. 365,599 filed May 31, 1973, now abandoned.

BACKGROUND OF THE INVENTION

The manufacture of plastic items by the injection-molding process often leaves excess solidified plastic pieces known as sprues and runners. These, of course, represent plastic that has solidified within the channels through which the molten plastic passes in order to reach the mold cavity for the actually desired item. Although the development of new molding techniques now permits the substantial avoidance of sprues and runners in molding many parts, these techniques do not represent suitable alternatives in all instances, especially for limited production runs. Consequently the production of sprues and runners continues. It is also common to perform part inspections at the molding apparatus and to either manually or automatically reject defective parts and use them for scrap.

These sprues and runners and scrap represent to the manufacturer a source of plastic equal to 8% to 25% of the total material and cannot be wasted. The additional problem arises, moreover, that this plastic, having once undergone the molding process, should only constitute a small portion of the total mix used for further molding. The recycled utilization of the sprues and runners generally requires grinding or other comminuting and subsequent inclusion, in a proper amount, with fresh plastic.

Commonly, an installation for the manufacture of plastic articles includes several molding stations. The raw plastic ingredients generally are blended together in a central blending room from which they can pass to each of the stations in batches, along conveyors or through pneumatic conduits. Collecting the sprues and runners produced at each of the stations, returning them to the central blending room, storing them, subsequently grinding them and attempting to introduce them into the plastic material in proper proportions for molding represents a time-consuming and unpleasant task. Oftentimes, the task simply passes undone. Developing a system that would permit at each station the grinding up of the sprues and runners immediately upon removing them from the desired molded object, and their reintroduction at the station into the stream of plastic for molding and also grinding reject parts represents an appreciable economy both in terms of time and money. However, these economies have yet to be realized.

One approach to providing a system to allow the facile handling of the sprues and runners and reject parts involves grinding at each station and entraining the resultant pellets in a fluid stream for transportation to the apparatus and subsequent combination with fresh plastic. However, this type of system requires the valving of the various fluid streams in order to combine their contents in the correct proportion. It has been found in the course of the work resulting in this invention that a single pneumatic source for two separate supplies of comminuted materials cannot effectively be used with a proportional valve or other continuous proportioning systems. It has been found that the most effective systems involve "on-off" valving.

However, valves designed to control the flow of homogeneous fluids display limitations which preclude their use in systems as proposed above in which the fluids contain suspended solids. Efforts made to overcome these limitations and provide suitable valves for these systems have not met with complete success.

The typical gate valve, which has worked very well for homogeneous fluids, simply does not close on fluids with suspended solids. The pellets prevent the seating of the closing member.

The bladder valve includes a plastic portion forming part of the tube through which the fluid passes. An inflatable bladder includes this plastic portion of the tube. Inflating this bladder produces a constriction of the plastic portion of the tube, eventually closing off the tube entirely.

While the bladder valve possesses the capability to completely close off a fluid stream carrying suspended pellets, it suffers from a drawback of a different nature. The pellets striking the plastic produce both mechanical and thermal destructive forces on the plastic side walls. As a result, the bladder valve experiences a short lifetime when included in systems handling pelletized solids.

The problem becomes further aggravated in the particular systems described above requiring a diverter valve. In these systems, of course, the diverter valve selects from several sources one which will provide the material it contains to a common receptacle. Such a diverter valve also has perhaps a more conventional function of selecting one of several receptacles that the material from a common source will enter. The flapper valve, which has seen frequent use in this type of system, has a rigid flap located on an arm attached to a pivot. The flap can then pivot to close one of two openings from the source into conduits leading to separate containers. Again, however, the rigid flap experiences difficulty in closing upon pellets suspended in the fluid stream and suffers substantial wear and deterioration from bombardment.

SUMMARY OF THE INVENTION

A processing system, facilitating the reuse of residue material produced by a material forming apparatus, basically includes storage, return and supply means. The storage means stores a predetermined amount of material for use in the material forming apparatus. The return means operates cyclically and returns the residue material produced generally by the apparatus to the storage means. The supply means supplements the residue materials with materials from a source to maintain the predetermined amount of material in the storage means. The residue material produced by the apparatus is cyclically returned to the storage means, where it is combined with sufficient other material to maintain the amount of material in the storage means at the predetermined level.

Moreover, a valve that finds useful service in this type of materials system having fluidized particles includes simply two pieces of substantially rigid material and a piece of plastic located between them. Each of the pieces of substantially rigid material has a hole through it and a substantially smooth surface in the area surrounding one end of its hole. These two pieces of material are held together in a spaced-apart relationship with each of the smooth surfaces facing the other piece of the material.

The piece of plastic has a hole through it such that when it aligns with the end of the hole through one of the pieces of rigid material surrounded by the smooth surface it also falls into alignment with the smooth end of the hole in the other piece of rigid material. Although the piece of plastic occupies substantially all of the space between the two pieces of rigid material, yet it leaves sufficient space so that it moves freely between them.

The plastic's freedom of movement between the two pieces of rigid material causes the minimization or total disappearance of the problem of valve jamming. However, allowing such a large clearance between the valve's closing member, that is, the piece of plastic, and the two pieces of rigid material would normally permit the dissipation of the fluid pressure which provides the propulsion for the stream passing through the valve. To preclude this dissipation of pressure, the piece of plastic must display some deformability. Specifically, it must deform under fluid pressure without, however, any substantial loss of shape or integrity. Thus, the piece of plastic will deform slightly to completely seal the valve in its closed configuration, without undergoing such alteration as to destroy itself and thus the valve. Of course, the piece of plastic must possess sufficient size that when its hole does not come into alignment with the holes in the rigid material, it completely covers the end of the hole in at least one of the pieces of rigid material.

This type of valve particularly facilitates the handling of fluid systems described above which contain suspended solid pellets. The fluid, with the suspended pellets, is passed to the hole in one of the pieces of substantially rigid material. It enters through the end of the hole not necessitating the substantially smooth surface in its vicinity. Moving the piece of plastic so as to align its hole with those of the pieces of rigid material permits the passage of the fluid with its solids through the plastic and the other piece of rigid material and then to a receptacle. Maintaining a differential fluid pressure between the source and the receptacle, with the higher fluid pressure at the source provides the motive power for transporting the fluid. Moving the piece of plastic so as to alternately bring its hole into and out of alignment with those in the pieces of rigid material will alternately permit and prohibit the passage of the fluids.

Where each piece of rigid material has exactly one hole through which fluid passes, the valve operates as a simple on-off valve. Including more than one hole for fluids in at least one of the pieces of rigid material permits the valve to operate as a diverter valve. In the latter case, depending upon the direction of the differential pressure, the valve can either permit the flow from a single source to one of a number of receptacles or, alternatively, from one of a number of sources to a single receptacle. The second piece of rigid material may have several holes in it, in which case channels leading from these holes may connect together at some point removed from that piece of rigid material, to form one conduit which then passes to the receptacle, or the channels can all themselves connect to the receptacle. Of course, the holes on the upstream piece of rigid material can each connect to a separate source. Reversing the direction of flow would, of course, interchange the functions of the sources and receptacle.

In the diverter valve the piece of plastic may also possess one or several holes for the passage of fluid. If the piece of plastic possesses merely one hole, that hole aligns one of the holes in the first piece of rigid material with a hole on the second piece of rigid material. Changing its alignment with different holes will connect various sources to the receptacle through the valve. Providing the piece of plastic with several holes instead of one will permit a change in the same supplying the receptacle less motion of the plastic required. This, of course, imposes less stringent requirements upon the moving means that effectuates this motion of the plastic. This savings results from the fact that instead of having to move a single hole in the plastic to align with all of the holes in the pieces of material, smaller motions may align one of many holes in the plastic with the desired holes in the rigid material while simultaneously bringing other holes in the plastic out of alignment with the holes in the pieces of material.

BRIEF DESCRIPTION OF THE DRAWINGS

FIG. 2 gives a top view of the valve of FIG. 1 with its conduits needed for connection to other components in a system.

FIG. 5 shows a frontal view of a simple on-off valve in its closed position.

FIG. 5A gives a cross-sectional view along the line 5A — 5A of the valve in FIG. 5.

FIG. 6 gives a partially cutaway perspective view of the valve of FIG. 5.

FIG. 7 shows an alternate embodiment of the valve with a freely moving plastic closing member in which the pieces of rigid material have a curved, as opposed to flat, configuration.

FIG. 8 portrays a cross-sectional view along the line 8—8 of FIG. 7.

DETAILED DESCRIPTION OF THE INVENTION

Figure 1:
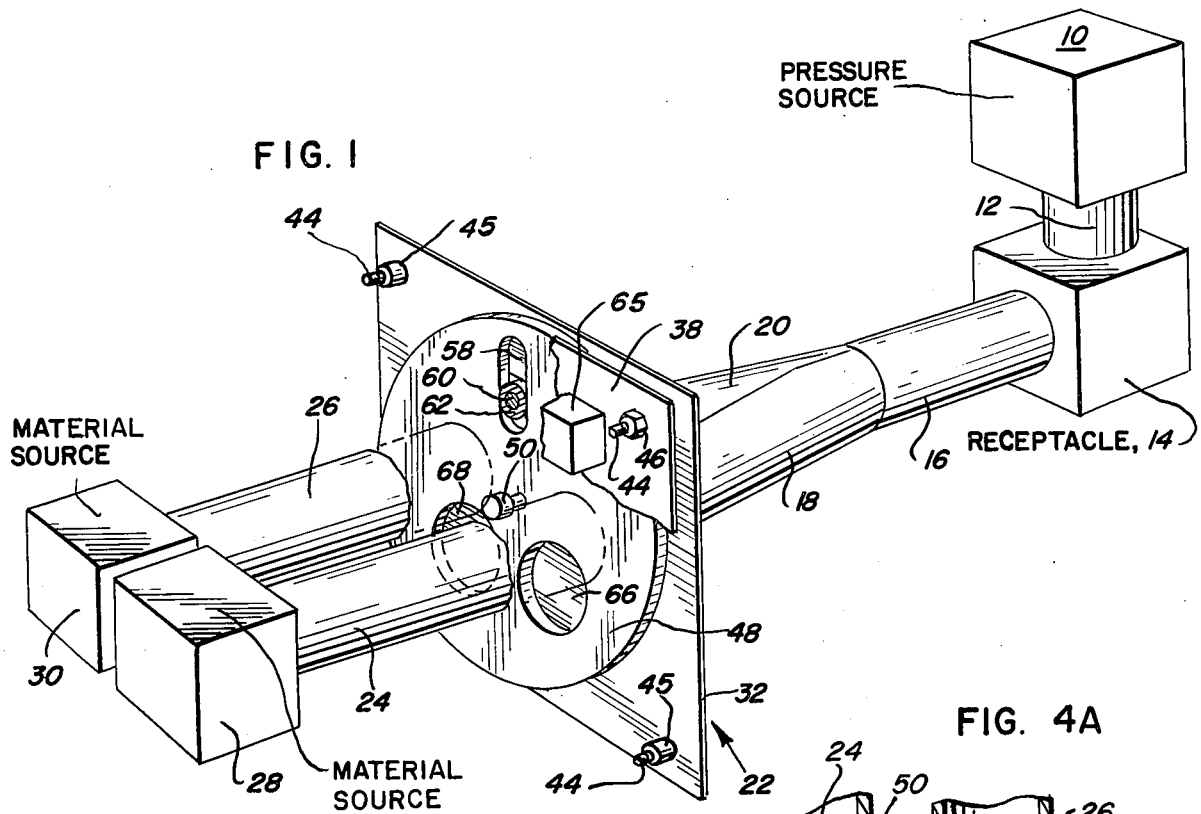
FIG. 1 shows a partially cut-away perspective view of a valve having a freely moving piece of plastic functioning as its closing member. It also shows diagramatically the components needed to complete a fluid handling system.
Figure 9:
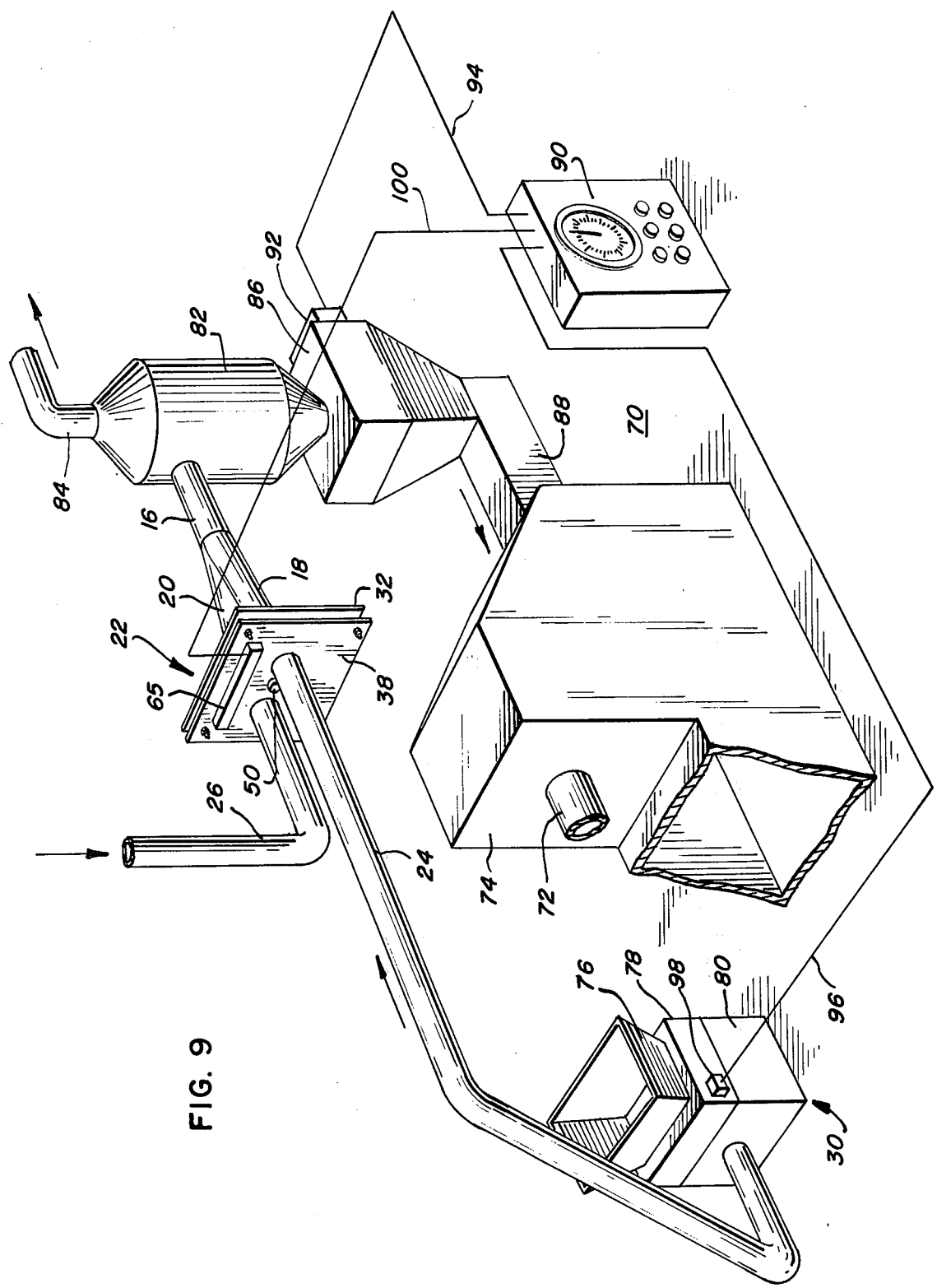
FIG. 9 displays a particular fluid-handling system constructed in accord with the outline of FIG. 1 which allows the facile reintroduction of residue plastic with a stream of fresh plastic for subsequent reuse.

The materials processing system outlined in FIG. 1 and shown in detail in FIG. 9 permit the automatic introduction of ground-up sprues, runners and other residue material at each of the stations into the main feed stream of plastic coming from the central blending room. It does so while accomplishing the correct proportioning of residue added to fresh plastic. In the systems shown diagramatically in FIG. 1, the receptacle 14 connects to the conduit 16 which divides into the two separate conduits 18 and 20. These latter two conduits 18 and 20, in turn, connect to one side of the valve indicated generally at 22. On the other side of the valve 22, the two conduits 24 and 26 align generally with the conduits 18 and 20. The two conduits 24 and 26 then couple to the separate material sources 28 and 30, respectively. The pressure source 10 connected by conduit 12 to the receptacle 14 applies a differential pressure between the receptacle 14 and either of the two material sources 28 and 30 which finds a passageway through valve 22 to the receptacle 14.

When the pressure source 10 applies a vacuum to the receptacle 14, this receptacle 14 will, of course, contain a lower fluid pressure than the sources of material 28 and 30. Accordingly, the fluid flow will carry material from either of the sources 28 or 30 selected by the valve into the receptacle 14. On the other hand, should the pressure source 10 apply a positive pressure to the receptacle 14, then the flow of fluids containing the material will proceed in the reverse direction. The material will then pass from the receptacle 14 to whichever of the sources 28 of 30 selected by the valve 22. In this latter event, the functions of the sources and the receptacle become reversed. In either case, the introduction of solid material must be controlled in a manner known in the art to maintain an optimum fluid/solid ratio and avoid jamming the conduits.

As opposed to coupling the pressure source 10 to the receptacle 14, the material sources 28 and 30 could carry pressure sources, which would accomplish substantially the same objective. Of course, by necessitating several pressure sources, this latter arrangement represents a loss of economy.

Figure 4A:
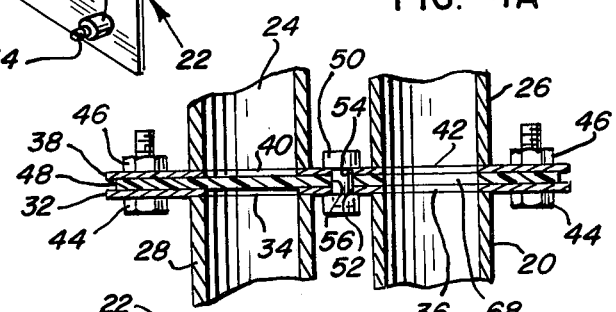
FIG. 4A gives a cross section view along the line 4A — 4A of the valve in FIG. 4.
Figure 3:
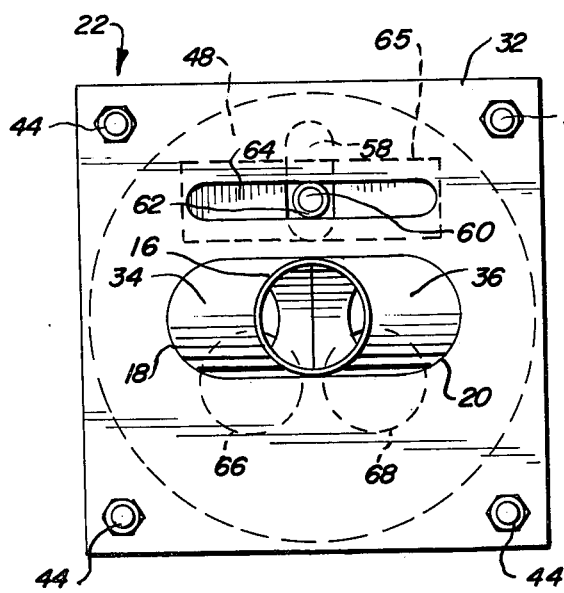
FIG. 3 gives a rear view of the valve of FIG. 1 showing in phantom the plastic closing member in a neutral position.
Figure 4:
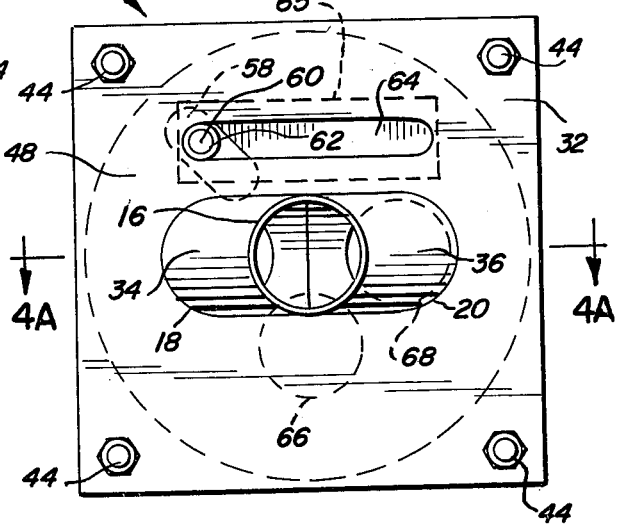
FIG. 4 shows the same view of FIG. 3 but locates the plastic closing member in a position in which one hole through the valve remains open while the piece of plastic closes the other.

The two conduits 18 and 20 connect to the solid plate 32 of the valve 22 around the holes 34 and 36 in that plate as seen in FIGS. 3-4A. A weld forms the joinder between the plate and the two conduits. The other solid plate 38 has circular holes, located at 40 and 42, and aligned generally with the holes 34 and 36 in the first plate 32. The conduits 24 and 26 welded to the plate 38 surround the holes 40 and 42, respectively, as shown most clearly in FIG. 4A. The bolts and nuts 44 and 46 serve to hold the two plates 32 and 38 together while the spacers 45 maintain the space between them.

Located between the two metal plates 32 and 38 the plastic disk 48 acts as the closing member of the valve. The pin 50 serves to locate the plastic disk 48 centrally between the two plates 32 and 38 while at the same time permitting rotation of the disk 48 about that pin. The pin 50, of course, passes through openings 52 and 54 in the plates 32 and 38, respectively, and the hole 56 through the plastic disk 48.

The disk 48 also has an opening 58 into which is inserted a cross-pin of piston 60 and bushing 62, the latter of which may also be a ball bearing. The piston 60 moves parallel to the web 48 and carries the cross-pin shown in bushing 62 which passes into an opening 64 in the plate 32. The piston 60 attaches to the actuating mechanism 65 located adjacent to the plate 38. The actuating mechanism 65 serves to move the piston back and forth in the direction indicated by the opening 64 and the plate 32. Examples of suitable actuators include electrically-, magnetically-, or air-actuated pistons which may also have spring loading.

When the piston 60, and consequently the bushing 62, move back and forth in the opening 64 it also engages the plastic disk 48 to rotate about the pin 50. The rotational motion thus imparted to the plastic disk relative to the plates 32 and 38 serves to open and close the valve, as discussed below.

The plastic disk 48 in a preferred form is made from 3/16 inch polyethylene sheet and has two holes 66 and 68 through it. FIGS. 1 and 3 show the piston 60 and bushing 62 located at about the middle of the opening 64 in the plate 38 with the result that the holes 66 and 68 in the plastic disk provide partial passageways for both sets of conduits; in other words, a portion of the hole 66 aligns with and provides a passageway between the conduits 18 and 24, while part of the hole 68 provides a partial passageway between the conduits 20 and 26. This does not represent a normal operating position of the type of valve illustrated in these figures.

FIG. 4, on the other hand, does display a typical operating position of the valve illustrated in these figures. There, the actuator 65 has caused piston 60 and bushing 62 to move towards one end of the opening 64 in the plate 32. In doing so, it has pushed against the sides of the opening 58 of the plastic disk causing it to rotate about the pin 50. In this depicted position, the hole 68 in the plastic disk provides a complete passageway between the conduits 20 on one side of the valve and the conduit 26 on the other through the holes 36 and 42 on the plates 32 and 38 respectively.

The other opening 66 in the disk 48 does not align with any of the conduits leading to the valve and hence becomes non-functional. Moreover, merely a solid face of plastic covers the holes 34 and 40 to which the conduits 18 and 24 attach. Consequently, no passageway exists between the two conduits 18 and 24 and, accordingly, they are closed by the action of the valve.

At this point, the actuator 65 can cause the piston 60 and bushing 62 to move to the opposite end of the opening 64 in the plate 32 and force the plastic disk 48 to rotate around the pin 50 to the right, as viewed from the vantage point of FIG. 4. By doing so, the holes 66 are then aligned with the holes 34 and 40 in the plates 32 and 38, respectively, providing a passageway between conduits 18 and 24. On the other hand, the holes 68 in the plastic disk would no longer align with the holes 36 and 42, and accordingly, the passageway between conduits 20 and 26 becomes closed.

In order to avoid jamming, especially on fluid systems containing suspended particles, the plastic disk 48 must move freely between the plates 32 and 38. Making the disk sufficiently thin will, of course, permit this facile movement. Generally, making the distance between the plates at least about 0.001 to 0.01 inch larger than the thickness of the plastic disk will insure its easy movement. However, providing a tolerance of this magnitude between the plastic disk 48 and the plates 32 and 38 leaves a space through which the fluid pressure within the system could dissipate. The preclusion of this dissipation requires the selection of a plastic disk which can prevent the escape of fluid. To accomplish this, the plastic disk 48 must have the capability of deforming under pressure in order to seal the opening through which the pressure could dissipate.

On the other hand, should the plastic undergo a substantial loss of either its integrity or its shape, it would at least lose its capability for further functioning and could possibly lose its present capability of sealing off one of the openings. Accordingly, the plastic disk, even under the applied fluid pressure, must not undergo a substantial loss of either its integrity or its shape.

Organic polymers display the desired characteristics of deformability without substantial loss of integrity or shape. Polyethylene represents a convenient choice amongst these. This type of polymer also displays a self-lubricative property. In other words, it facilitates its own motion across the plates 32 and 38.

Of course, in the diverter valve arrangement of FIGS. 1 through 4A, the plastic disk 48 need not have both of the holes 66 and 68. With minor modifications to the overall geometry, a single hole in the plastic disk 48 switching from alignment with one pair of conduits and closure of the other pair to the opposite would suffice. The arrangement illustrated in the figures, however, provides for quicker and simplified switching and switch drives.

FIG. 9 shows a specific example of the fluid-handling system diagrammed in FIG. 1. This system combines the sprue, runner and any other residue components of used plastic with the new plastic prepared in the central blending room. In this example, the conduit 26 leads to the central blending room and draws in a plastic mix prepared from a fresh source. The conduit 26 leads to the vicinity of an individual molding station indicated at 70 where the valve 22 is located.

The other material source 30 would be situated at the molding station itself. After a run or cycle, the operator at the station would simply take the sprues, runners or other residue from the mold shown broken away at 72 of the press 74, also shown partially cutaway, place them in a hopper 76 which empties into the small grinder 78 at the station which in turn empties into the receptacle 80. This receptacle 80, of course, then connects by the conduit 24 to the valve 22.

The two conduits 18 and 20 then lead into the single conduit 16 which empties into a vacuum loader or alternatively the cyclone separator 82 where the solids are separated by gravity and fall into hopper 86. A vacuum applied to the separator 82 through the conduit 84 draws in the pelletized plastics from whichever source has a clear passageway to the separator 82 through selector apparatus 22. The vacuum applied through the conduit 84 has entrained the plastic pellets in a stream of air. The cyclone separator 82 permits the particles to spiral around and fall out of the air stream, thus separating them from the air. From the separator 82, they fall into the receptacle 86 from which they may pass along the circuit 88 into the press 74 by augering or the like.

After a run of the press 74, the switch 92 determines if the level of the plastic in the receptacle 80 has fallen below a predetermined level. If so, it signals the timer 90 along the connector 94 to replenish the supply in the receptacle 86.

The timer sends a signal along the connector 96 to the switch 98 which turns on the grinder 78 if not then operating to grind up the residue material from the prior run. Preferably, though, the grinder 78 operates continuously, obviating the switch 98. The timer also informs the valve 22 along the cable 100 to actuate piston mechanism 65 to provide a passageway between the conduits 24 and 18. By doing so, the vacuum from the conduit 84 draws the ground plastic from the receptacle 80 along the conduit 24. It then passes through the valve 22, through the conduits 18 and 16, into the separator 82, from which it falls into the hopper 86 for use in subsequent runs.

After all of the residual plastic has been ground into pellets and passed through the valve 22, the timer informs the valve to switch positions and provide a passageway between conduits 26 and 20, in order to draw fresh plastic from the blending room into the separator 82 and receptacle 86.

The amount of residue material produced by the press 74 generally remains the same from run to run and represents a generally known quantity varying somewhat with the number of included rejected parts. The timer 90 is then preset to run the grinder 78 and to maintain the passageway between the conduits 24 and 18 open for a sufficient period of time so that all of the residue for a run will pass to the receptacle 86. The residue generally may be about 8% to about 25% of the total material used. After the complete passage of the residue, the timer is preset to then allow the passage through the valve 22 of sufficient fresh plastic from the blending room to provide in the receptacle 86 the correct ratio of fresh plastic to the residual plastic from the previous run. The timer will then close the passageway in the valve 22 between the conduits 26 and 20 after thus supplying the receptacle 86 with the correct proportions of old and new material.

However, should the valve 22 not remain open to the grinder 78 to allow the passage of the total residue from the prior run, then the length of time in which the valve 22 provides open passageways to the different material sources 28 and 30 provides for the correct proportioning between the different types of material. The fraction of the time that the valve permits each of the conduits to remain open determines the proportion of the material passing through that conduit that will enter the receptacle 86. For example, if the valve 22 allows the conduit 24, which leads to the fresh plastic, to remain open 85 percent of the time, with the conduit 26, leading to the used plastic, remaining open the other 15 percent, then the fresh plastic will constitute 85 percent of the material used in subsequent molding if both supplies are adequate. Clearly, automatic control of the actuator 65 will permit unsupervised production of the correct proportioning of the different materials. Furthermore, this proportioning achieved through this time-sharing at the valve 22 represents a practical method of combining ingredients in the situation where the two sources each contain a sufficiently large quantity of material to preclude the passage of the entire contents of either during the single cycle.

One of the advantages that the valve 22 displays in providing this automated proportioning derives from its capability to undergo a change in position at the same time that the fluid with suspended particles passes through the valve. To assist in this rapid change of positions while in use, the width of the plastic disk 48 should generally exceed the size of the particles suspended in the fluid. When this happens, the particles, rather than tending to become stuck and jamming the valve, will merely remain in the hole through the piece of plastic between the sheets of metal 32 and 38, there to remain until the hole through the plastic again aligns with the openings in the sheets 32 and 38. Generally, for systems in which air represents the fluid, a disk thickness of at least 1/16 of an inch and preferably 3/16 of an inch will provide this benefit.

FIGS. 5, 5A and 6 illustrate a simple on-off valve. Analagous parts in FIGS. 5 through 6 and in FIGS. 1 through 4 carry numbers differing by exactly one hundred. The single conduit 116 attaches to the plate 132 at its hole 135. The plastic plate 148 has a single circular hole 167 which can rest either in or out of alignment with the holes 135 and 141 in the plates 132 and 138, respectively. On the other side of the valve 122 in these figures the single conduit 125 attaches to the plate 138 at its hole 141. When, as shown in the figures, the hole 167 in the disk 148 does not align with the holes 135 and 141 in the plates, the valve rests in its off position. The piston 160 with its bushing 162 moves along opening 164 in the plate 132 to bring the hole 167 into alignment with the holes in the plastic; the valve is then in its open position.

FIGS. 7 and 8 show a valve which does not use flat sheets of rigid material. Rather, it uses a single curved sheet 232 in conjunction with the conduit 225 having a hole 241 through it. Parts in FIGS. 7 and 8 analogous to those in the prior figures bear numbers differing by one or two hundred from the analogous parts.

Thus, the material enters the conduit 216, passes through the hole 235 in the sheet 232, through the hole 267 in the plastic sheet 248 when properly aligned, then through the hole 241, and lastly into and through the conduit 225. When the top end of the conduit 225 is closed, this valve operates as a simple on-off valve as illustrated. With minor modification the valve in these last two figures could take on the functions of a diverter valve of the type illustrated in FIGS. 1 through 4A. Moreover, the portions of rigid material 232 and 225 need not necessarily have the form of sheets. All that is required are two pieces of rigid material having holes through them and a piece of plastic having a hole through it that can come into and out of alignment with the holes in the two pieces of rigid material.

Either valve arrangement may advantageously be used with the systems taught in FIGS. 1 and 9 and form an important part of the invention. However, the systems can be utilized with other selector apparatus and obtain the benefits of the system also.

What is claimed is:

1. Selector apparatus for comminuted material entrained in a gaseous fluid comprising:
   a. first and second pieces of substantially rigid material, each defining a surface, each of said pieces of material having at least one hole in said surface;
   b. means supporting said pieces of material with their surfaces in fixed relationship to define a uniform space therebetween and with the holes in substantial alignment;
   c. a web of deformable material disposed between said first and second pieces, said web having a transverse dimension significantly less than the transverse dimension of said space, whereby said web is freely movable in said space and said fluid may pass freely between said web and said plate surfaces, said web being transversely deformable under pressure to engage one of said surfaces to form a substantial fluid tight seal without substantial loss of shape of integrity and having an aperture therethrough such that when said aperture is aligned with said holes a passageway is provided between said holes, said transverse dimension being sufficient to permit movement of said web between said surfaces while substantially filling said space, the web being sufficiently large to overlie said holes when said web is moved to a position where said aperture is not aligned with said holes;
   d. mounting means supporting said web in a position with said aperture in alignment with said holes and permitting movement of said web means in said space relative to said plates to a position where said aperture is out of alignment with said holes; and
   e. moving means for moving said web relative to said pieces to alternatively bring said aperture into and out of alignment with said holes.

2. The selector apparatus of claim 1 wherein the distance between said first and second pieces of material is substantially constant in the area surrounding said holes.

3. The selector apparatus of claim 2 wherein each of said pieces of material has the shape of a substantially flat sheet in the area of said holes.

4. The selector apparatus of claim 2 wherein:
   a. said first piece of material has at least two holes therethrough;
   b. for each of at least two of said holes through said first piece of material, said web has an aperture therethrough such that when the hole in said web aligns with a hole in said first piece of material, said aperture aligns with a hole in said second piece of material thereby providing a passageway between at least two holes in said first piece of material and at least one hole in said second piece of material; and
   c. said moving means moves said web so as to alternately provide and remove a passageway between at least two holes in said first piece of material and, for each of said two holes in said first piece of material, a hole in said second piece of material.

5. The selector apparatus of claim 4 wherein:
   a. both of said pieces have at least two holes therethrough;
   b. said web has an apertured portion therethrough such that:
      1. when said apertured portion is aligned with a first hole in said first piece of material, an aperture therein is aligned with a first hole in said second piece of material; and
      2. when said apertured portion is aligned with a second hole in said first piece of material, an aperture therein is aligned with a second hole in said second piece of material; and
   c. said moving means moves said web to align said apertured portion alternately with said first and second holes in said first piece of material.

6. The selector apparatus of claim 4:
   a. wherein both of said pieces of material have at least two holes therethrough;
   b. said web has more than one aperture therethrough such that when:
      1. a first aperture is aligned with a first hole in said first piece of material, said first aperture is also aligned with a first hole in said second piece of material; and
      2. when a second aperture is aligned with a second hole in said first piece of material, said second aperture is aligned with a second hole in said second piece of material; and
   c. said moving means moves said web to alternately
      1. align said first aperture with said first hole in said first piece of material; and
      2. align said second aperture with said second hole through said first piece of material.

7. The selector apparatus of claim 2 wherein:
   a. said first and second pieces each have a first hole and a second hole therethrough;
   b. said web has an apertured portion in a position suitable for selective, exclusive alignment of an aperture in said web with any one of said holes in said first piece; and
   c. said moving means moves said web with respect to said pieces to move said aperture portion and alternately bringing an aperture therein into alignment with said second holes through said pieces.

8. The selector apparatus of claim 2 wherein:
   a. said first and second pieces each have a first and a second hole therethrough;

b. said web has a plurality of apertures therethrough individually positioned on said web for selective alignment of certain of said apertures with any one of said holes in said first piece, the alignment of any one aperture with any one hole being exclusive of alignment of any other aperture with any other hole; and c. said moving means moves said web to alternately
 1. bring a first of said apertures into alignment with said first holes in said pieces of material; and
 2. bring a second of said apertures into alignment with said second holes in said pieces of material.

9. The selector apparatus of claim 8 wherein:
a. both of said pieces and said web all have the form of flat sheets;
b. said web is composed of an organic polymer; and
c. said moving means causes said web to rotate about a point with regards to said pieces.

10. The selector apparatus of claim 9 wherein said web is composed of polyethylene and has a thickness of about 3/16 inch and about from 0.001 to 0.01 inch less than the distance between said pieces.

11. Selector apparatus for comminuted material entrained in a gaseous fluid comprising:
a. a first plate having first and second holes and a substantially planar surface;
b. a second plate having first and second holes and a substantially planar surface;
c. a deformable web of a self-lubricating material having first and second holes;
d. means for holding said first and second plates in spaced relationship with said planar surface of said first plate parallel to and in juxtaposition with said planar surface of said second plate and spaced apart to define a uniform generally planar space therebetween;
e. said first holes of said plates being in substantial alignment and said second holes of said plates being in substantial alignment;
f. means mounting said deformable web for movement between said plates for alternately bringing said first holes of said plates and said web into alignment and said second holes of said plates and said web into alignment and for movement of said web transversely relative to the plane of said plates, the space between said first and said second plate being greater than the thickness of said web whereby said web is freely movable therein and said fluid may pass freely between said web and said planar plate surfaces, said web being transversely deformable under pressure to engage one of said surfaces to form a substantially fluid-tight seal therewith;
g. said holes of said web being positioned on said web such that alignment of one of said holes in said web with any of said holes in said plates is exclusive of alignment of the other hole in said web with any of said holes of said plates; and
h. means for moving said web.

12. A system for combining solid comminuted material entrained in a gaseous fluid comprising:
selector apparatus operable with two separate comminuted material sources comprising:
a. first and second pieces of substantially rigid material, each defining a surface, and each having a first hole and a second hole therethrough;
b. means supporting said pieces of material with their surfaces in fixed relationship to define a uniform space therebetween and with the holes in substantial alignment;
c. a web of deformable material disposed between said first and second pieces, said web having a transverse dimension significantly less than the transverse dimension of said space, whereby said web is freely movable in said space and said fluid may pass freely between said web and said plate surfaces, said web being transversely deformable under pressure to engage one of said surfaces to form a substantial fluid-tight seal without substantial loss of shape or integrity and having an apertured portion in a position suitable for selective, exclusive alignment of an aperture in said web with any aligned holes in said first and second pieces, the web being sufficiently large to overlie said holes when said web is moved to a position where said aperture is not aligned with said holes;
d. mounting means supporting said web in a position with said aperture in alignment with said holes and permitting movement of said web means in said space relative to said plates to a position where said aperture is out of alignment with said holes; and
e. moving means for moving said web relative to said pieces to move said aperture portion and alternatively bring an aperture therein into alignment with said second holes through said pieces;

and further comprising two channels one of said channels connecting one of said two sources to a hole in said first piece and the other channel connecting the other source to another hole in said first piece; a receptacle into which the comminuted material from said sources are to be combined; channel means for connecting said receptacle with the holes in said second piece of material brought into alignment with said web with the holes in said first piece of material connected to said sources by said two channels and means for maintaining a differential fluid pressure between said sources and said receptacle with the higher pressure appearing at said source and the lower pressure appearing at said receptacle.

13. A system for combining solid comminuted material from several sources and entrained in a gaseous fluid comprising:
selector apparatus comprising:
a. first and second pieces of substantially rigid material, each defining a surface, each of said pieces of material having a first and a second hole therethrough;
b. means supporting said pieces of material with their surfaces in fixed relationship to define a uniform space therebetween and with the holes in substantial alignment;
c. a web of deformable material disposed between said first and second pieces said web having a transverse dimension significantly less than the transverse dimension of said space, whereby said web is freely movable in said space and said fluid may pass freely between said web and said plate surfaces, said web being transversely deformable under pressure to engage one of said surfaces to form a substantial fluid-tight seal without substantial loss of shape or integrity and having a plurality of apertures therethrough individually positioned on said web for selective alignment of certain of said apertures with any one of said holes in said first piece, the alignment of any one aperture with any one hole being exclusive of alignment of any other aperture with any other hole, the web being sufficiently large to overlie said holes when said web is moved to a position where said aperture is not aligned with said holes;

d. mounting means supporting said web in a position with said aperture in alignment with said holes and permitting movement of said web means in said space relative to said plates to a position where said aperture is out of alignment with said holes; and e. moving means for moving said web relative to said pieces to alternately
  1. bring a first of said apertures into alignment with said first holes in said pieces of material; and
  2. bring a second of said apertures into alignment with said second holes in said pieces of material; separate channels connecting each of said sources to a separate hole in said first piece; a receptacle into which the comminuted material from said sources are to be combined; channel means connecting said receptacle with the holes in said second piece brought into alignment by said web with the holes in said first piece connected by said separate channel to said separate sources; and means for maintaining a differential fluid pressure between said sources and said receptacle with the higher pressure appearing at said sources and the lower sources appearing at said receptacle.

14. Selector apparatus for use with a source of subambient pressure for selectively transferring comminuted material from a first source of material or from a second source of material to a receptacle comprising:

a. first and second pieces of substantially rigid material, each defining a surface, and each having a first hole and a second hole therethrough;

b. means supporting said pieces of material with their surfaces in fixed relationship to define a uniform space therebetween and with the holes in substantial alignment;

c. a web of deformable material disposed between said first and second pieces, said web having a transverse dimension significantly less than the transverse dimension of said space, whereby said web is freely movable in said space and said fluid may pass freely between said web and said plate surfaces, said web being transversely deformable under pressure to engage one of said surfaces to form a substantial fluid-tight seal without substantial loss of shape or integrity and having an apertured portion in a position suitable for selective, exclusive alignment of an aperture in said web with any aligned holes in said first and second pieces, the web being sufficiently large to overlie said holes when said web is moved to a position where said aperture is not aligned with said holes;

d. mounting means supporting said web in a position with said aperture in alignment with said holes and permitting movement of said web means in said space relative to said plates to a position where said aperture is out of alignment with said holes; and e. moving means for moving said web relative to said pieces to move said aperture portion and alternatively bring an aperture therein into alignment with said second holes through said pieces;

and further comprising two channels, one of said channels connecting one of said two sources to a hole in said first piece and the other channel connecting the other source to another hole in said first piece, a receptacle into which the comminuted material from said sources are to be combined; channel means for connecting said receptacle with the holes in said second piece of material brought into alignment with said web with the holes in said first piece of material connected to said sources by said two channels and means for maintaining a differential fluid pressure between said sources and said receptacle with the higher pressure appearing at said source and the lower pressure appearing at said receptacle;

said selector apparatus connected at said first hole of said first piece to said first source of comminuted material and at said second hole of said first piece to said second source of comminuted material;

said selector apparatus being connected at said first and second holes of said second piece to said receptacle; and said mounting means permitting movement of said web between said plates to align said aperture portion selectively with said first holes or said second holes and to permit movement of said web between said plates transverse to the plane of said plates to form a seal therewith and to respond to a different subambient pressure between said sources and said receptacle to selectively transfer comminuted material from said sources to said receptacle.

15. Selector apparatus for use with a source of differential subambient pressure for selectively transferring comminuted material from separate sources of material to a receptacle, said selector apparatus comprising:

a. first and second pieces of substantially rigid material, each defining a surface, each of said pieces of material having a first and second hole therethrough;

b. means supporting said pieces of material with their surfaces in fixed relationship to define a uniform space therebetween and with the holes in substantial alignment;

c. a web of deformable material disposed between said first and second pieces said web having a transverse dimension significantly less than the transverse dimension of said space, whereby said web is freely movable in said space and said fluid may pass freely between said web and said plate surfaces, said web being transversely deformable under pressure to engage one of said surfaces to form a substantial fluid-tight seal without substantial loss of shape or integrity and having a plurality of apertures therethrough individually positioned on said web for selective alignment of certain of said apertures with any one of said holes in said first piece, the alignment of any one aperture with any one hole being exclusive of alignment of any other aperture with any other hole, the web being sufficiently large to overlie said holes when said web is moved to a position where said aperture is not aligned with said holes;

d. mounting means supporting said web in a position with said aperture in alignment with said holes and permitting movement of said web means in said space relative to said plates to a position where said aperture is out of alignment with said holes; and e. moving means for moving said web relative to said pieces to alternately
  1. bring a first of said apertures into alignment with said first holes in said pieces of material; and
  2. bring a second of said apertures into alignment with said second holes in said pieces of material;

separate channels connecting each of said sources to a separate hole in said first piece; a receptacle into which the comminuted material from said sources are to be combined; channel means connecting said receptacle with the holes in said second piece brought into alignment by said web with the holes in said first piece connected by said separate channel to said separate sources; and means for maintaining a differential fluid pressure between said sources and said receptacle with the higher pressure appearing at said sources and the lower sources appearing at said receptacle;

said apparatus being connected at each hole of said first piece to such sources of comminuted material respectively;

said selector apparatus being connected at each hole of said second piece to said receptacle;

said mounting means permitting movement of said web between said plates to align said aperture selectively with said first holes or said second holes and to permit movement of said web between said plates transverse to the plane of said plates to form a seal therewith and to respond to a differential subambient pressure between said sources and said receptacle to transfer selectively comminuted material from said sources to said receptacle.

16. In an arrangement having a first source of comminuted material, a second source of comminuted material, a first channel connected to said first source, a second channel connected to said second source, a receptacle, channel means connected to said receptacle and having first and second ports, pressure means for maintaining a differential pressure between said sources and said receptacle, and selector means for coupling said first and second channels to said first and second ports of said channel means the improvement comprising:

a. said selector means comprising first and second pieces of substantially rigid material, each defining a surface, and each having a first hole and a second hole therethrough;

b. means supporting said pieces of material with their surfaces in fixed relationship to define a uniform space therebetween and with the holes in substantial alignment;

c. a web of deformable material disposed between said first and second pieces, said web having a transverse dimension significantly less than the transverse dimension of said space, whereby said web is freely movable in said space and said fluid may pass freely between said web and said plate surfaces, said web being transversely deformable under pressure to engage one of said surfaces to form a substantial fluid-tight seal without substantial loss of shape or integrity and having an apertured portion in a position suitable for selective, exclusive alignment of an aperture in said web with any aligned holes in said first and second pieces, the web being sufficiently large to overlie said holes when said web is moved to a position where said aperture is not aligned with said holes;

d. mounting means supporting said web in a position with said aperture in alignment with said holes and permitting movement of said web means in said space relative to said plates to a position where said aperture is out of alignment with said holes; and e. moving means for moving said web relative to said pieces to move said aperture portion and alternatively bring an aperture therein into alignment with said second holes through said pieces;

and further comprising two channels, one of said channels connecting one of said two sources to a hole in said first piece and the other channel connecting the other sources to another hole in said first piece; a receptacle into which the comminuted material from said sources are to be combined; channel means for connecting said receptacle with the holes in said second piece of material brought into alignment with said web with the holes in said first piece of material connected to said sources by said two channels and means for maintaining a differential fluid pressure between said sources and said receptacle with the higher pressure appearing at said source and the lower pressure appearing at said receptacle;

said first and second holes in said first piece are connected to said first and second channel; and said first and second holes in said second piece are connected to said first and second ports.

* * * * *

UNITED STATES PATENT AND TRADEMARK OFFICE
CERTIFICATE OF CORRECTION

PATENT NO. : 4,019,535

DATED : April 26, 1977

INVENTOR(S) : Paul John Buckethal

It is certified that error appears in the above-identified patent and that said Letters Patent are hereby corrected as shown below:

Column 7, line 37, change "circuit" to --conduit--

Column 9, line 47, claim 1, change "of" (2nd occurrence) to --or--

Signed and Sealed this twenty-sixth Day of July 1977

[SEAL]

Attest:

RUTH C. MASON
*Attesting Officer*

C. MARSHALL DANN
*Commissioner of Patents and Trademarks*